(12) United States Patent
Lin et al.

(10) Patent No.: US 6,570,366 B1
(45) Date of Patent: May 27, 2003

(54) ACTIVE POWER FACTOR CORRECTION CIRCUIT

(75) Inventors: Pao-Chuan Lin, Shinchu Hsien (TW); Yung-Hsiang Liu, Taipei (TW); Yi-Hua Liu, ChangHwa Hsien (TW); Hsiao-Chih Ku, Taoyuan Hsien (TW); Te-An Tsai, TaiChung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/026,523

(22) Filed: Dec. 27, 2001

(30) Foreign Application Priority Data

Nov. 12, 2001 (TW) ........................................ 90128031 A

(51) Int. Cl.[7] ................................................ G05F 1/70
(52) U.S. Cl. .......................................... 323/207; 363/89
(58) Field of Search ................................ 323/207, 208, 323/205, 209; 363/44, 82, 89, 90, 126, 127

(56) References Cited

U.S. PATENT DOCUMENTS 4,930,064 A * 5/1990 Tanaka et al. ............. 318/729
5,801,517 A * 9/1998 Borle ......................... 323/207

* cited by examiner

Primary Examiner—Shawn Riley
(74) Attorney, Agent, or Firm—Intellectual Property Solutions, Incorporated

(57) ABSTRACT

An active power factor correction circuit. The circuit comprises a voltage source having a first end and a second end, an inductor having an end coupled to the first end of the voltage source, a first rectifying device having an anode coupled to the other end of the inductor and a cathode, a second rectifying device having a cathode coupled to the cathode of the first rectifying device and an anode, a first switching device having a first terminal coupled to the anode of the first rectifying device and a second terminal, a second switching device, having a first terminal coupled to an anode of the second rectifying device and the second end of the voltage source and a second terminal, a capacitor having two ends coupled to the cathode of the second rectifying device and the second terminal of the second switching device respectively, and an auxiliary circuit for switching the first and second switching devices under zero voltage.

10 Claims, 9 Drawing Sheets

ACTIVE POWER FACTOR CORRECTION CIRCUIT

BACKGROUND OF THE INVENTION

1. Field of the Invention

The present invention relates to a power factor correction circuit (hereinafter referred to as a PFC circuit), more particularly to an active power factor correction circuit.

2. Description of the Related Art

Generally, there are two types of PFC circuits, active and passive. However, passive PFC circuits have been eliminated from the competition gradually, due to the large layout area of the passive PFC circuit and a power factor below 0.95, with the harmonic waves thereof being large. Therefore, passive PFC circuits have been replaced by active PFC circuits. As shown in FIG. 1a, a conventional active PFC circuit 10 comprises a bridge rectifier that consists of four diodes D1, D2, D3 and D4, and a voltage source Vs, an inductor L1, a diode D5, a capacitor C1 and a switching device S1. By switching the switching device in high frequency appropriately, the active PFC circuit attains a high power factor.

The operation of the conventional active PFC circuit, as shown in FIG. 1a, is described as follows. When the voltage at node A1 is positive, the voltage at node B1 is negative, and the switching device S1 is off, the main current I flows to the capacitor C1 (or load) through the diode D1, the inductor L1, and diode D5, and then flows back to the voltage source Vs through the diode D4, as shown in FIG. 1b. When the switching device S1 is on, the main current I flows from node A1 to node B1 though diode D1, the inductor L1, the switching device S1, and the diode D4, as shown in FIG. 1c. A power factor of more than 0.99 can be achieved by the above method.

Although the power factor can be increased to more than 0.99 by switching the switching device in high frequency, the switching device inevitably generates power dissipation (or loss) when it turns on and turns off, thus degrading the efficiency of the PFC circuit and wasting energy. Also, the temperature raised due to the operation of the switching device will damage the elements in the PFC circuit.

Consequently, a PFC circuit with a snubber circuit is disclosed to reduce the power loss due to the operation of the switching device, as shown in FIG. 2a. The PFC circuit 20 comprises a bridge rectifier coupled to a voltage source Vs, an inductor L2, a diode D26, a capacitor C2, a switching device S2, and a snubber circuit 210 connected in parallel with diode D26 and the switching device S2. As shown in FIG. 2a, the bridge rectifier consists of four diodes D21, D22, D23 and D24. The snubber circuit 210 consists of an inductor Lr2, a diode D28, and a switching device Sa2 connected in series, two diodes D25 and D27, and a capacitor Cr2. The switching device S2 can carry out zero-voltage switching operation to avoid power dissipation, in conjunction with the snubber circuit 210.

The operation of the conventional active PFC circuit 20, as shown in FIG. 2a, is described as follows. When the voltage at node A2 is positive and the voltage at node B2 is negative, and the switching device S2 is off, the main current I2 flows to the capacitor C2 (or load) through the diode D21, the inductor L2 and diode D26, and then flows back to the voltage source Vs though the diode D24, as shown in FIG. 2b.

Referring to FIG. 2c, when both switching devices S2 and Sa2 are off, the main current I2 flows as described in FIG. 2b. The current Io equals the main current I2, therefore the current Ir is zero. Before the switching device S2 turns on, the switching device Sa2 must turn on first. When the switching device Sa2 turns on, a voltage across the inductor Lr2 equals the voltage on the capacitor C2. Consequently, the current on the inductor Lr2 increases from zero slowly. When the current Ir equals to the main current I2, based on Kirchoff's Law, the current Io becomes zero. Namely, the diode D26 is off. At this time, the capacitor Cs2 and inductor Lr2 start to resonate. Until the voltage on the capacitor Cs2 decreases to zero, the switching device S2 can then be turned on, so the switching device S2 has no power loss during the switching period.

As shown in FIG. 2d, the main current I2 flows from node A2 to node B2 through the diode D21, the inductor L2, the switching device S2, and diode D24. By the above operation, the switching device S2 dissipates no power during its switching period, due to zero-voltage switching operation, and a high power factor is also obtained.

After the switching device S2 turns on, the energy stroed in the inductor Lr2 charges the capacitor Cr2 through the diode D25 when the switching device Sa2 turns off, as shown in FIG. 2d. When the current Ir decreases to zero, the diode D25 turns off. Consequently, the switching device Sa2 is soft-switched off and the diode D25 is soft-switched on and off.

However, the main current (I or I2) of the PFC circuit (without or with a snubber circuit), must flow through at least three power electronic devices. Namely, as shown in FIG. 1b, the main current I of the PFC circuit 10 flows though diode D1, D5 and D4 when the switching device S1 is off. As shown in FIG. 1c, the main current I of the PFC circuit 10 flows through diode D1, the switching device S1 and diode D4 when the switching device S1 is on. Further, the main current I2 of the PFC circuit 20, as shown in FIG. 2b, flows though diode D21, D26 and D24 when the switching device S2 is off. As shown in FIG. 2c, the main current I2 of the PFC circuit 20 flows through diode D21, the switching device S2 and diode D24 when the switching device S2 is on. The more power electronic elements the main current (I or I2) flows through, the more power dissipation is generated, therefore resulting in poor efficiency in energy transformation.

SUMMARY OF THE INVENTION

It is therefore an object of the present invention to provide an active PFC circuit, making the main current only flow through two power electronic elements using two switching devices, thereby reducing power consumption and improving the efficiency of the PFC circuit.

The other object of the present invention is to provide a soft-switched active PFC circuit, wherein the main current not only flows through two electric elements, but also avoids power loss due to switching, thereby improving the efficiency.

The present invention achieves the above-indicated objects by providing an active PFC circuit for improving the efficiency of a voltage source with first and second terminals, comprising the following structure.

An inductor having an terminal coupled to the first terminal of the voltage source.

A first rectifying device having an anode coupled to the other terminal of the inductor, and a cathode.

A second rectifying device having a cathode coupled to the cathode of the first rectifying device, and an anode;

A first switching device having a first terminal coupled to the anode of the first rectifying device, and a second terminal.

A second switching device, having a first terminal coupled to the anode of the second rectifying device and the second terminal of the voltage source, and a second terminal.

A capacitor having two terminals coupled to the cathode of the second rectifying device and the second terminal of the second switching device respectively.

Further, the present invention also provides a soft-switched active PFC circuit for improving the efficiency of a voltage source with first and second terminals, comprising a first module and a second module. The structure and function of the first module are identical to the PFC circuit described above according to the present invention.

The main object of the second module is to make the first and second switching devices S31 and S32 carry out the operation of zero-voltage switching. The second module (or auxiliary circuit) comprises the following structure.

A third rectifying device having an anode coupled to the first terminal of the second switching device, and a cathode.

A fourth rectifying device having an anode and cathode coupled to the anode of the first rectifying device and the cathode of the third rectifying device respectively.

A fifth rectifying device having a cathode coupled to the cathode of the second rectifying device, and an anode.

A sixth rectifying device having a cathode coupled to the anode of the fifth rectifying, and anode.

An auxiliary capacitor having two terminals coupled to the cathode of the third rectifying device and anode of the fifth rectifying device respectively.

An auxiliary inductor having two terminal coupled to the cathode of the third rectifying device and the anode of the sixth rectifying device respectively.

An auxiliary switching device having a first terminal and a second terminal coupled to the anode of the sixth rectifying device and the second terminal of the second switching device respectively, and an enable terminal En4.

It is noted that the auxiliary switching device turns on before either the first switching device or the second switching device turn on.

BRIEF DESCRIPTION OF THE DRAWINGS

The following detailed description, given by way of example and not intended to limit the invention solely to the embodiment described herein, will best be understood in conjunction with the accompanying drawings in which:

FIG. 5 is a wave diagram illustrating the switching operation of switching devices and the key wave forms of the active power factor correction circuit with an auxiliary circuit of the present invention As shown in FIG. 4a.

DETAILED DESCRIPTION OF THE PREFERRED EMBODIMENT

Embodiments of the present invention will be described below with reference to the drawings.
(First Embodiment)

Figure 3A:
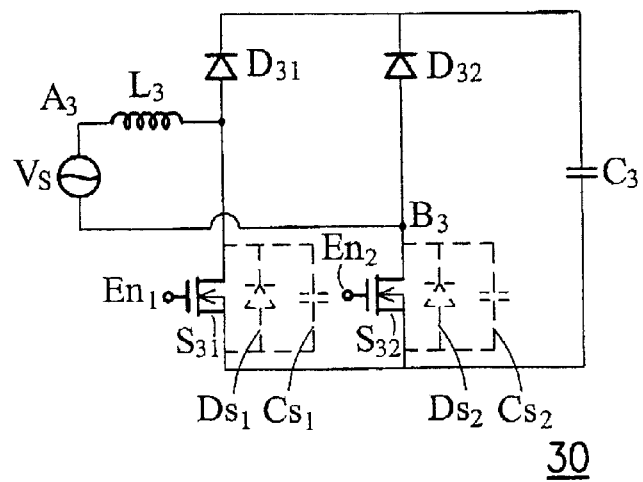
FIG. 3a is a circuit diagram illustrating an active PFC circuit of the present invention.

Referring to FIG. 3a, according to this invention, the active PFC (power factor correction) circuit comprises: an inductor L3, a first rectifying device D31, a second rectifying device D32, a first switching device S31, a second switching device S32, and a capacitor C3. For example, the first and second rectifying devices D31 and D32 are diodes in this embodiment.

The first and second rectifying devices (D31 and D32) and the first and second switching devices (S31 and S32) are sequentially connected in loop. The cathode of the first and second rectifying devices D31 and D32 are connected. One terminal of the capacitor C3 is connected to the cathodes of the first and second rectifying devices (D31 and D32); the other terminal is connected to the connection node of the first and second switching devices (S31 and S32). One terminal of the inductor L3 is connected to the anode of the first rectifying device S31; the other terminal of the inductor L3 is coupled to one terminal of a voltage source Vs. The other terminal of the voltage source Vs is coupled to the anode of the second rectifying device D32.

For example, the first and second switching devices (S31 and S32) are MOSFET or IGBT having parasitic diodes (Ds1 and Ds2) and parasitic capacitors (Cs1 and Cs2), in this embodiment. Turning the first and second switching devices S31 and S32 on or off depends on the enable signals applied to the gates (or enable terminals En1 and En2) of the first and second switching devices S31 and S32.

Figure 3B:
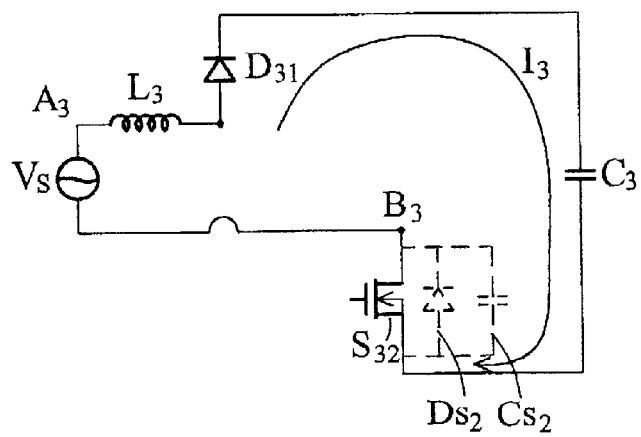
FIGS. 3b to 3e are diagrams illustrating operations of the active PFC circuit of the present invention.

The operation of the active PFC circuit 30 of the present invention will be described below in reference to FIG. 3b and FIG. 3c. When the voltages at nodes A3 and B3 of the voltage source Vs are positive and negative respectively, and the first switching device S31 is off, the main current I3 flows from node A3 to node B3, through the inductor L3, the first rectifying device D31, the capacitor C3, and the parasitic diode Ds2 when S32 turns off (or both the parasitic diode Ds2 and the second switching device S32 when S32 turns on), as depicted in FIG. 3b.

Figure 3C:
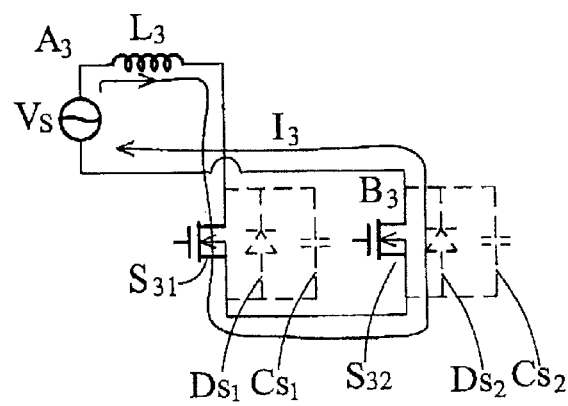

Referring to FIG. 3c, when the first switching device S31 turns on, the main current I3 flows from node A3 to node B3, through the inductor L3, the first switching device S31, and the parasitic diode Ds2 (or both the parasitic diode Ds2 and the second switching device S32) directly.

Figure 3D:
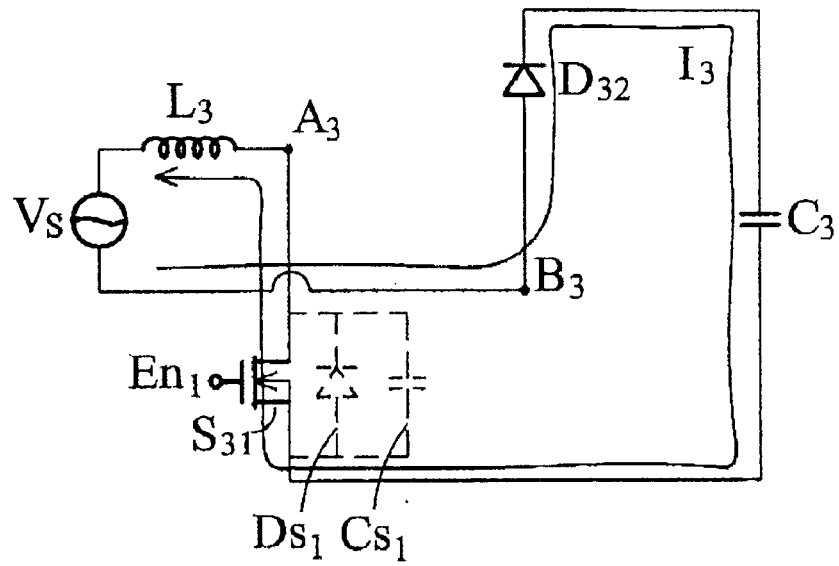

In the same way, when the voltages at nodes A3 and B3 of the voltage source Vs are negative and positive respectively, and the second switching device S32 is off, the main current I3 flows from node B3 to node A3, through the second rectifying device D32, the capacitor C3, the parasitic diode Ds1 when the first switching device S31 turns off (or both the parasitic diode Ds1 and the first switching device S31 when S31 turns on), and the inductor L3, as depicted in FIG. 3d.

Figure 3E:
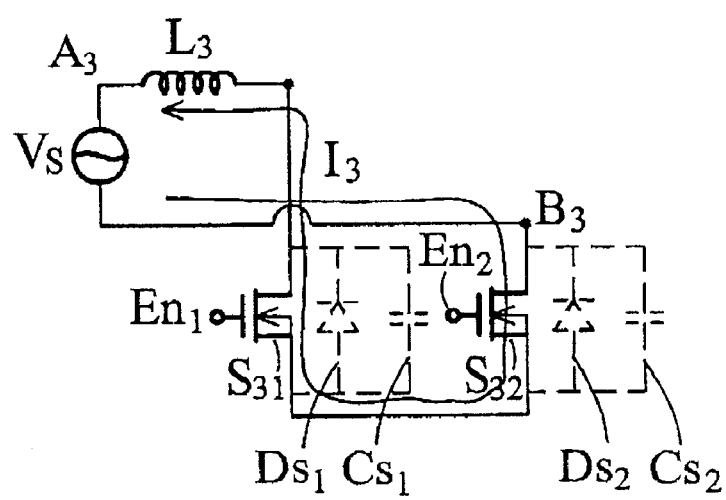

Subsequently, when the second switching device S32 turns on, the main current I3 flows from node B3 to node A3, through the second switching device S32, the parasitical diode Ds1 (or both the parasitic diode Ds1 and the first switching device S31), and the inductor L3 directly, as depicted in FIG. 3e.

The first switching device S31 and second switching device S32 can turn on at the same or different times according to the control of the enable signals.

The main current I3 only flows through the first rectifying device D31 and the parasitical diode Ds2 of the second switching device S32, as shown in FIG. 3b and only flows through the first switching device S31 and second switching device S32 as shown in FIG. 3c. Because the main current I3 only flows through two power electronic devices (shown in FIGS. 3b~3e), thus the active PFC circuit of the present invention can attain the object of correcting power factor and dissipate less power than the conventional PFC circuit.

(Second Embodiment)

Figure 4A:
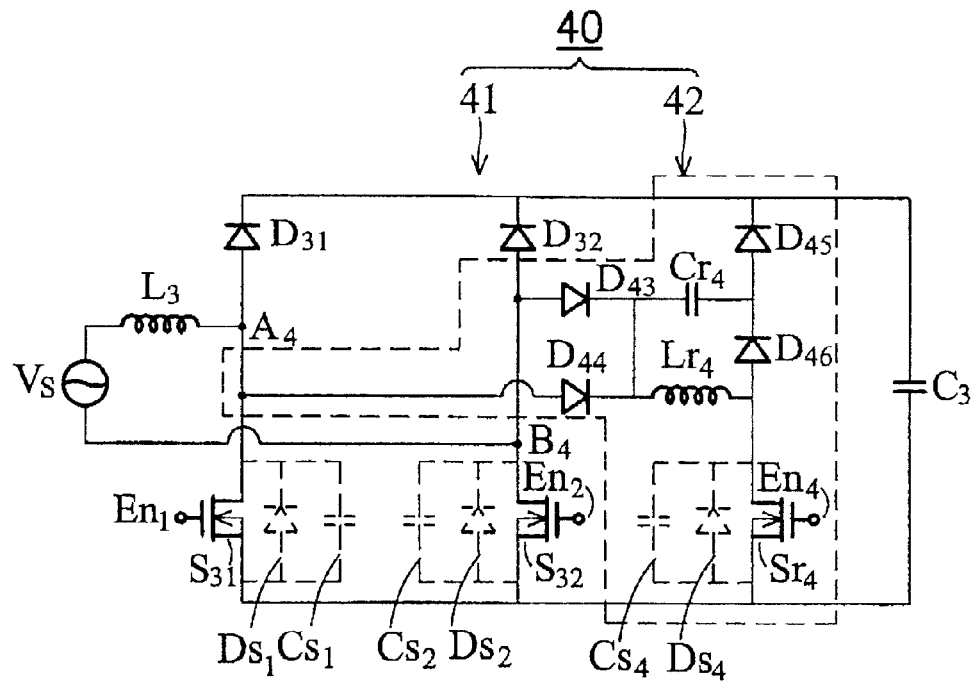
FIG. 4a is a circuit diagram illustrating an active power factor correction circuit with an auxiliary circuit of the present invention.

FIG. 4a shows a soft-switched active PFC circuit 40 according to an embodiment of the present invention. For brevity, the elements in FIG. 4a~4d the same as or similar with the elements in FIG. 3a~3e are depicted in the same numerals or notations.

Referring to FIG. 4a, the soft-switched active PFC circuit 40 comprises a first module 41 and a second module 42. The structure and function of the first module 41 are identical to the PFC circuit 30 described in the first embodiment, thus omitting its description in this embodiment. The main object of the second module 42 is to make the first and second switching devices S31 and S32 carry out the operation of zero-voltage switching.

The second module 42 comprises a third rectifying device D43, a fourth rectifying device D44, a fifth rectifying device D45 and a sixth rectifying devices D46, an auxiliary capacitor Cr4, an auxiliary inductor Lr4 and an auxiliary switching device Sr4. For example, the third to sixth rectifying devices D43~D46 are diodes, and the auxiliary switching device Sr4 is MOSFET or IGBT with a parasitic capacitor Cs4 and a parasitic diode Ds4 in this embodiment. Turning on or off the auxiliary switching devices Sr4 depends on the enable signal applied to the gate (or enable terminals En4) of the auxiliary switching devices Sr4. The auxiliary switching device Sr4, the sixth rectifying device D46 and the fifth rectifying device D45, connected in series, are connected in parallel with the capacitor C3, as depicted in FIG. 4a. The cathode of the third rectifying device D43 connects one terminal of the auxiliary capacitor Cr4, the anode of the third rectifying device D43 connects the anode of the second rectifying device D32, and the other terminal of the auxiliary capacitor Cr4 connects the cathode of the sixth rectifying device D46 (the anode of the fifth rectifying device D45). The cathode of the fourth rectifying device D44 connects one terminal of the auxiliary inductor Lr4, the anode of the fourth rectifying device D44 connects the anode of the first rectifying device D31, and the other terminal of the auxiliary inductor Lr4 connects the anode of the sixth rectifying device D46.

It is noted that the auxiliary switching device Sr4 turns on before the first switching device S31 and the second switching device S32, and the inductance of the auxiliary inductor Lr4 is much smaller than that of the inductor L3.

The operation of the soft-switched active PFC circuit 40 according to an embodiment of the present invention is described in detail hereinafter in reference with FIGS. 4a~4f and FIG. 5.

Figure 4B:
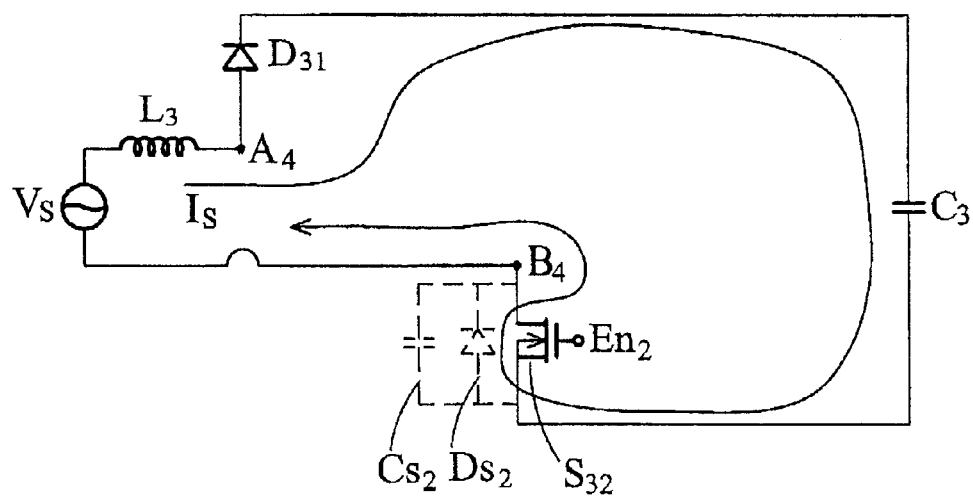
FIGS. 4b to 4f are diagrams illustrating operation of the active power factor correction circuit with an auxiliary circuit of the present invention.

Before time t1, the first, second and auxiliary switching devices (S31, S32 and Sr4) are off. Provided the voltages at nodes A4 and B4 of the voltage source Vs are positive and negative respectively, the main current Is flows from node A4 to node B4, through the inductor L3, the first rectifying device D31, the capacitor C3 (load), and the parasitic diode Ds2 of the second switching device S32, as depicted in FIG. 4b.

Figure 4C:
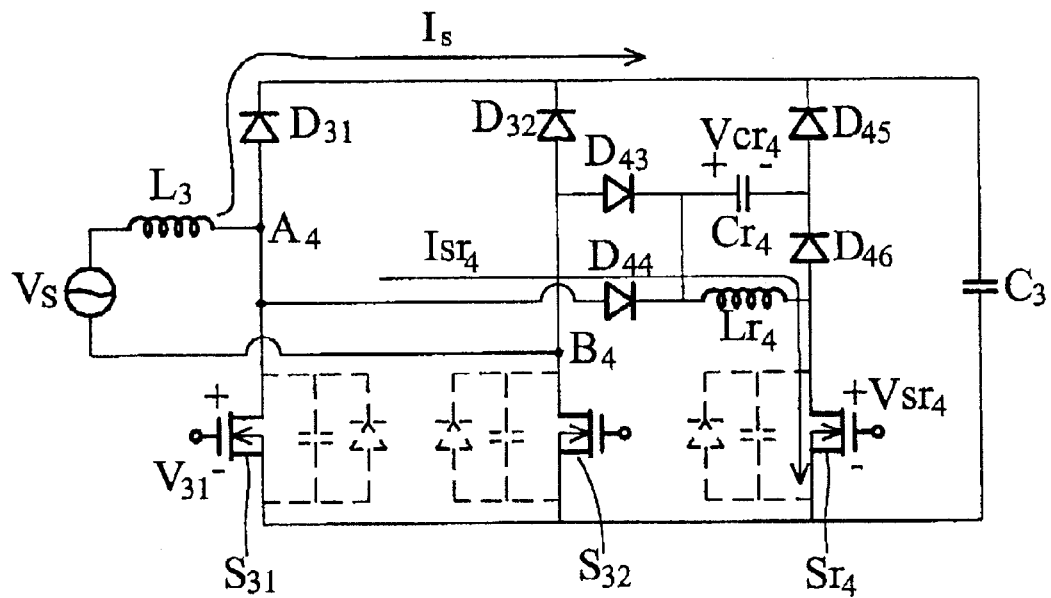
Figure 5:
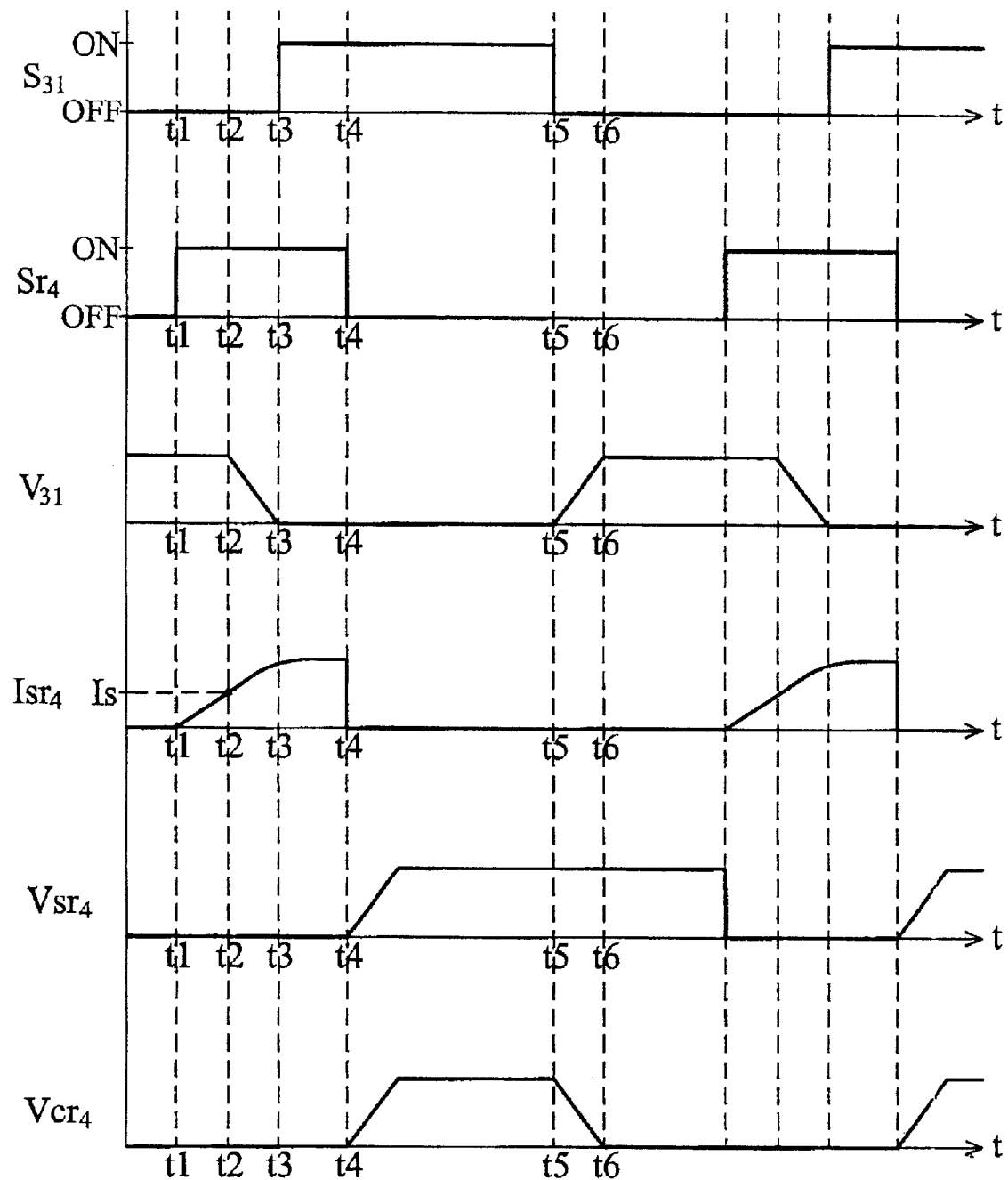

At time t1, the auxiliary switching device Sr4 turns on before the first switching device S31 so as to achieve soft-switched operation and avoid switching power loss caused by the first switching device S31. Referring to FIG. 4c and FIG. 5, after the auxiliary switching device Sr4 has turned on, the voltage across the auxiliary inductor Lr4 is approximately equal to that across the capacitor C3, because the first rectifying device D31 is on. Consequently, the current flow Isr4 through the auxiliary inductor L4 increases from zero.

At time t2, the current Isr4 is increased to equal the main current Is, and according to Kirchoff's Law, no current flows through the first rectifying device D31, namely, the first rectifying device D31 is off at this time.

Furthermore, between times t2 and t3, the parasitic capacitor Cs1 of the first switching device D31 starts to resonate with the auxiliary inductor Lr4, such that the current Isr4 increases continuously until the voltage (V31) across the parasitical capacitor Cs1 of the first switching device S31 discharges to zero.

Then, at time t3, the first switching device S31 turns on with no switching power loss since there is no voltage across the parasitic capacitor Cs1 of the first switching device S31.

Figure 4D:
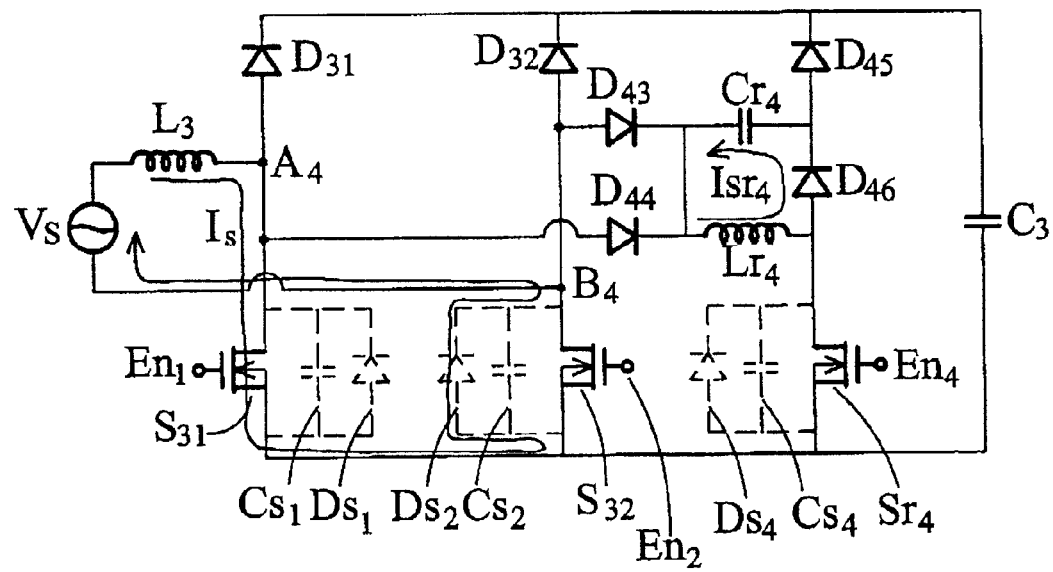

After the switching device S31 has turned on at time t3, the main current Is flows back to voltage source Vs through the inductor L3, the first switching device S31 and the parasitic diode Ds2 of the second switching device S32, as shown in FIG. 4d.

Also referring to FIG. 4d, at time t4, the auxiliary switching device Sr4 turns off. The current Isr4 flowing in the auxiliary inductor Lr4 will charge the auxiliary capacitor Cr4 through the sixth rectifying device D46 until the current Isr4 decreases to zero, then the sixth rectifying device D46 turns off. Consequently, the auxiliary capacitor Cr4 serves as a switching snubber of the auxiliary switching device Sr4. The auxiliary capacitor Cr4 also discharges to release energy by turning on the fifth rectifying device D45 to release energy, when the voltage across the auxiliary capacitor Cr4 is beyond that of the capacitor C3.

Figure 4E:
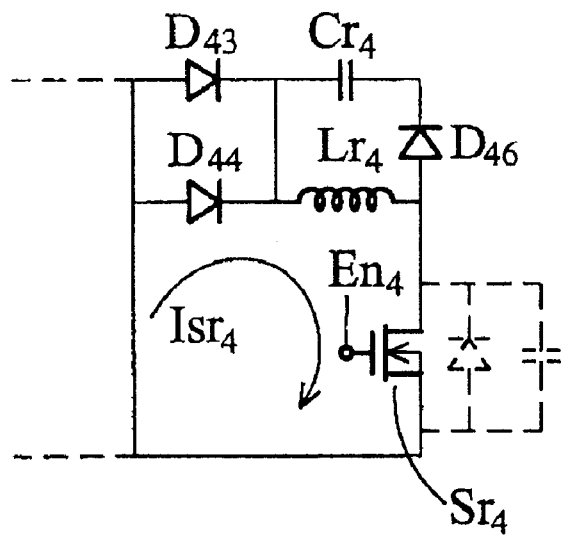
Figure 4F:
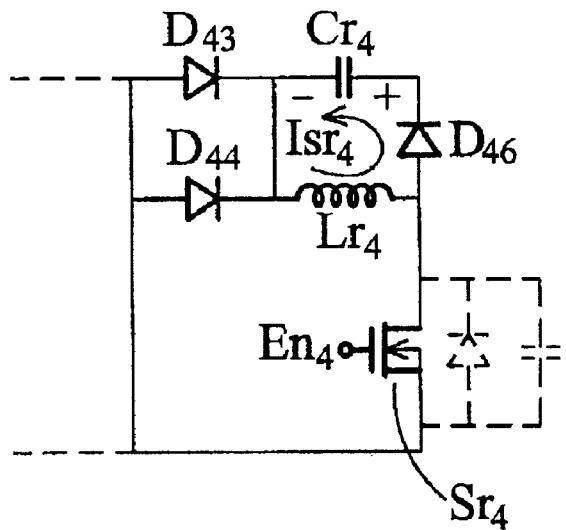

The soft-switched operation of the auxiliary switching device Sr4 is described as follows in reference with FIGS. 4e and 4f. As shown in FIG. 4e, when the auxiliary switching device Sr4 turns on at time t1, the current Isr4 flows back to the voltage source Vs through the fourth rectifying device D44, the auxiliary inductor Lr4 and the auxiliary switching device Sr4. However, when the auxiliary switching device Sr4 turns off at time t4, the current Isr4 in the auxiliary inductor Lr4 can not instantaneously change, thereby flowing to the auxiliary capacitor Cr4 through the sixth rectifying device D46. Further, the current Isr4 charges the auxiliary capacitor Cr4 until the energy on the auxiliary inductor Lr4 decreases to zero, namely, the Isr4 is zero. Then, the sixth rectifying device D46 turns off. It is clear that when the auxiliary switching device Sr4 carries out the switching operation, no current flows through it. Therefore, the auxiliary switching device Sr4 is soft-switched off. Also, the sixth rectifying device D46 is soft-switched on and off.

According to the above description, the first switching device S31 can turn on with zero voltage across it, and the auxiliary switching device Sr4 is soft-switched off. Therefore, the soft-switched active PFC circuit 40 can improve the power factor via switching operation and reduce the power dissipation (loss).

Similarly, the operation of the active PFC circuit 40 of the present invention, when the voltages at nodes A4 and B4 of the voltage source Vs are negative and positive, is analogous to the above description so as to be omitted.

Turning on or off the first, second and auxiliary switching devices S31, S32 and Sr4 depends on the signal applied to the enable terminals En1, En2 and En4 (or gates) of those switching devices respectively. It is noted that the auxiliary switching device Sr4 must turn on first, before the first or second switching device (S31 or S32) turns on. After the first or second switching device (S31 or S32) turns on, the auxiliary switching device Sr4 turns off immediately or keeps turning on for a delayed time then turning off.

Figure 1A:
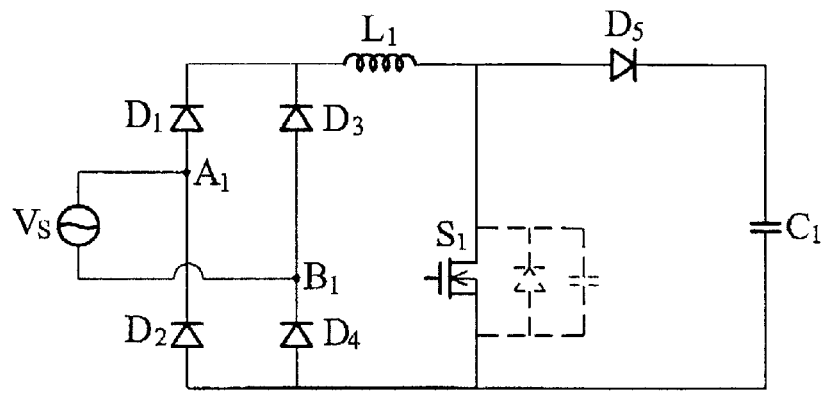
FIG. 1a is a circuit diagram illustrating a conventional active PFC circuit.
Figure 1B:
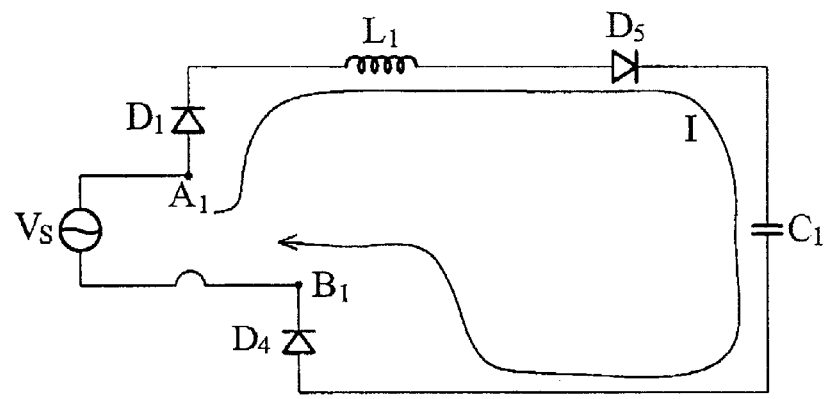
FIG. 1b and FIG. 1c are diagrams illustrating operation of the conventional active PFC circuit.
Figure 1C:
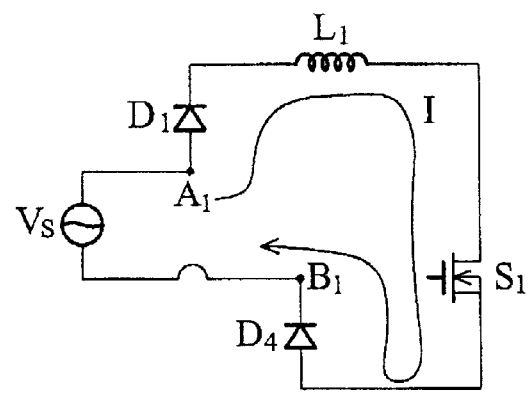
Figure 2A:
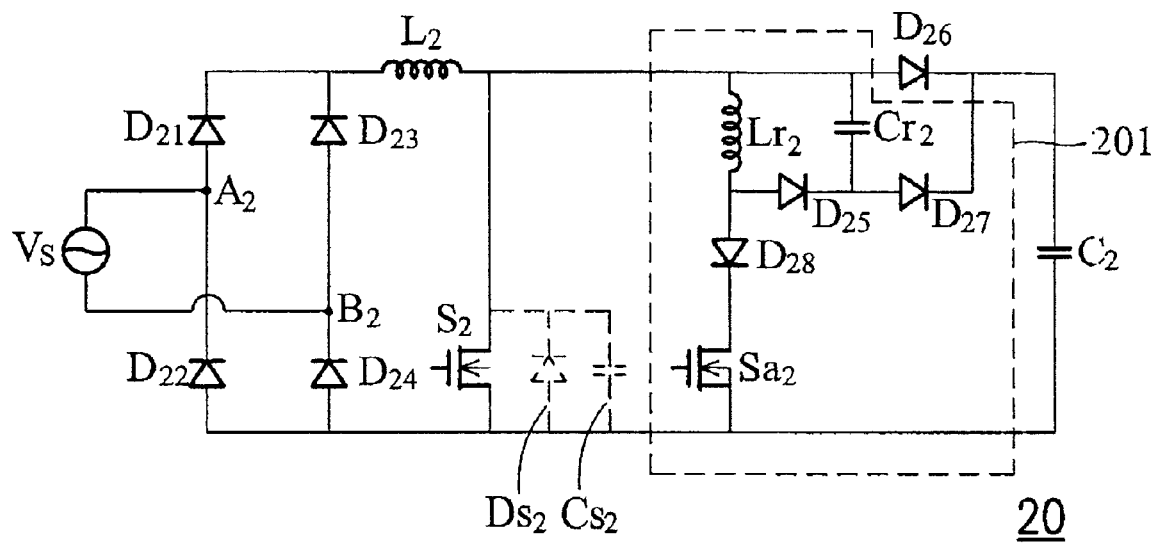
FIG. 2a is a circuit diagram illustrating a conventional active PFC circuit with a snubber circuit.
Figure 2B:
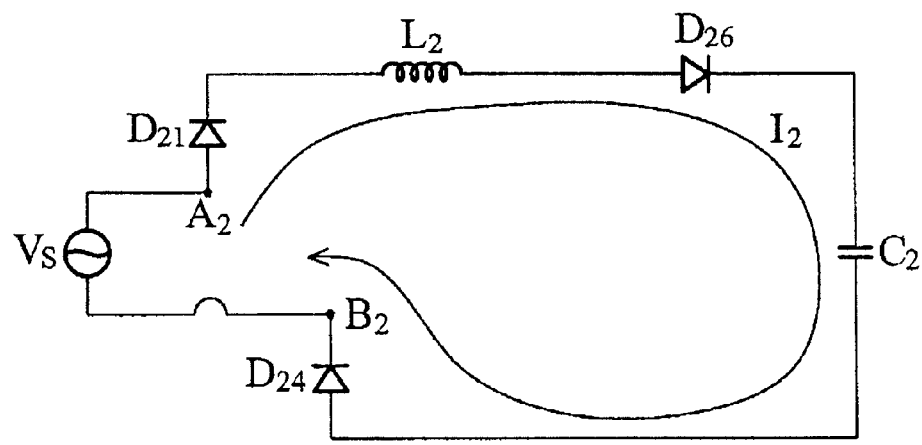
FIGS. 2b–2d are diagrams illustrating operations of the conventional active PFC circuit with a snubber circuit.
Figure 2C:
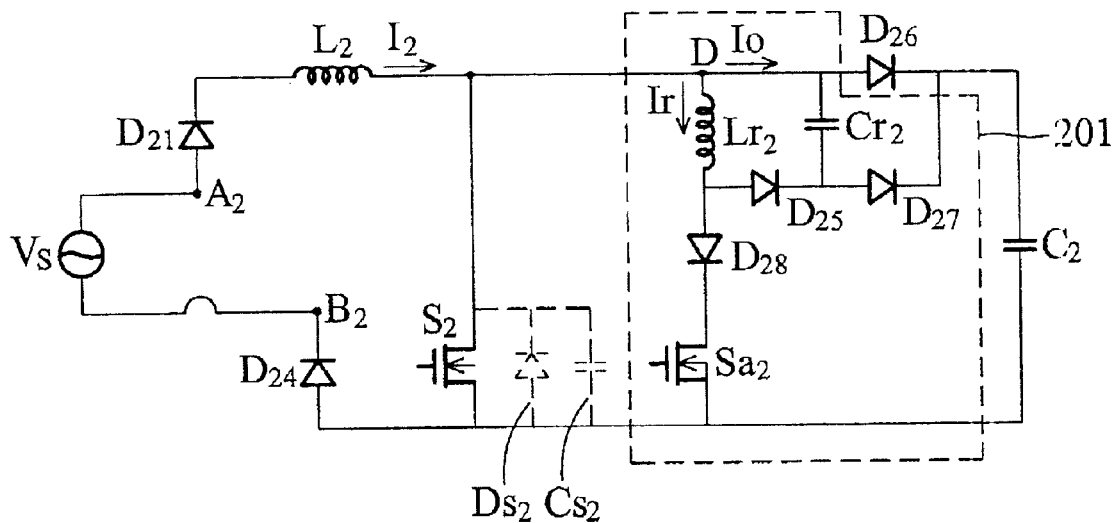
Figure 2D:
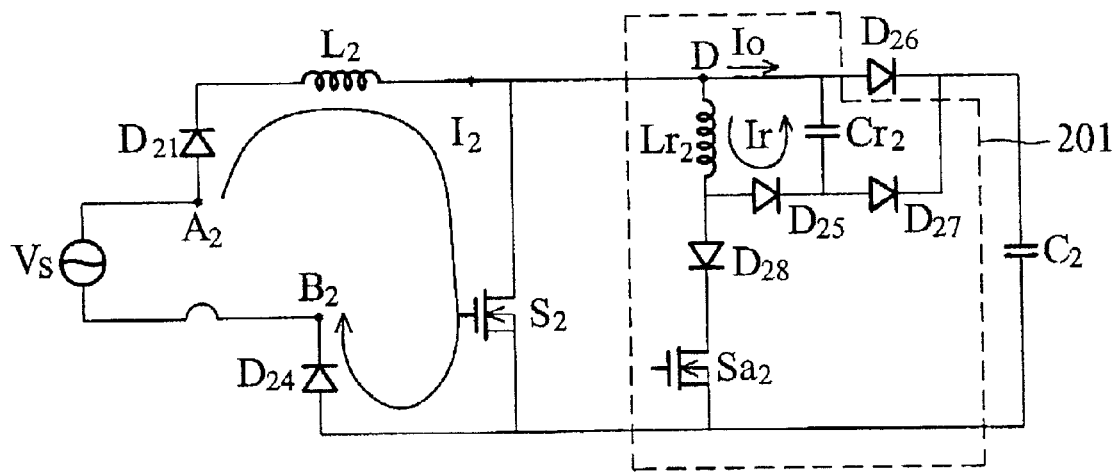

Moreover, as shown in FIG. 4b, the main current Is only flow through two power electronic devices, the first rectifying device D31 and the parasitical diode Ds2 of the second switching device S32. Similarly, as shown in FIG. 4d, the main current Is also flows through only two power electronic devices, the first switching device S31 and the parasitical diode Ds2 of the second switching device S32. In view of this, the main current of the present invention flows through fewer elements than the conventional power factor correction circuit as shown in FIG. 2a, such that power loss is decreased, thereby increasing efficiency.

What is claimed is:

1. An active power factor correction circuit for improving the efficiency of voltage source with first and second terminals, comprising:

an inductor having a terminal coupled to the first terminal of the voltage source;

a first rectifying device having an anode coupled to the other terminal of the inductor, and a cathode;

a second rectifying device having a cathode coupled to the cathode of the first rectifying device, and an anode;

a first switching device having a first terminal coupled to the anode of the first rectifying device, and a second terminal;

a second switching device, having a first terminal coupled to the anode of the second rectifying device and the second terminal of the voltage source, and a second terminal;

a capacitor having two terminals coupled to the cathode of the second rectifying device and the second terminal of the second switching device respectively; and an auxiliary circuit for making the first switching device and second switching device switch under zero voltage, wherein the first switching device and the second switching device are MOSFETs which comprise a parasitic diode and a parasitic capacitor.

2. An active power factor correction circuit as claimed in claim 1, wherein the auxiliary circuit comprises:

a third rectifying device having an anode coupled to the first terminal of the second switching device, and a cathode;

a fourth rectifying device having an anode and cathode coupled to the anode of the first rectifying device and the cathode of the third rectifying device respectively;

a fifth rectifying device having a cathode coupled to the cathode of the second rectifying device, and an anode;

a sixth rectifying device having a cathode coupled to the anode of the fifth rectifying, and anode;

an auxiliary capacitor having two terminals coupled to the cathode of the fourth rectifying device and anode of the fifth rectifying device respectively;

an auxiliary inductor having two terminals coupled to the cathode of the third rectifying device and the anode of the sixth rectifying device respectively; and an auxiliary switching device having a first terminal and a second terminal coupled to the anode of the sixth rectifying device and the second terminal of the second switching device respectively, and an enable terminal En4;

wherein the auxiliary switching device turns on before either the first switching device or the second switching device turns on.

3. An active power factor correction circuit as claimed in claim 1, wherein the first rectifying device and second rectifying are diodes.

4. An active power factor correction circuit as claimed in claim 2, wherein the auxiliary switching device is a MOSFET comprising a parasitic diode and a parasitic capacitor.

5. An active power factor correction circuit as claimed in claim 2 wherein the third to sixth rectifying devices are diodes.

6. An active power factor correction circuit for improving the efficiency of a voltage source with first and second terminals, comprising:

an inductor having an terminal coupled to the first terminal of the voltage source;

a first rectifying device having an anode coupled to the other terminal of the inductor, and a cathode;

a second rectifying device having a cathode coupled to the cathode of the first rectifying device, and an anode;

a first switching device having a first terminal coupled to the anode of the first rectifying device, and a second terminal;

a second switching device, having a first terminal coupled to the anode of the second rectifying device and the second terminal of the voltage source, and a second terminal;

an inductor having an terminal coupled to the first terminal of the voltage source;

a third rectifying device having an anode coupled to the first terminal of the second switching device;

a fourth rectifying device having an anode and cathode coupled to the anode of the first rectifying device and the cathode of the third rectifying device respectively;

a fifth rectifying device having a cathode coupled to the cathode of the second rectifying device;

a sixth rectifying device having a cathode coupled to the anode of the fifth rectifying device;

an auxiliary capacitor having two terminals coupled to the cathode of the fourth rectifying device and anode of the fifth rectifying device respectively;

an auxiliary inductor having two terminals coupled to the cathode of the third rectifying device and the anode of the sixth rectifying device respectively; and an auxiliary switching device having a first terminal and a second terminal coupled to the anode of the sixth rectifying device and the second terminal of the second switching device respectively, and a enable terminal;

wherein the auxiliary switching device turns on before either the first switching device or the second switching device turns on.

7. An active power factor correction circuit as claimed in claim 6 wherein the first, second, and auxiliary switching devices are MOSFETs comprising a parasitic diode and a parasitic capacitor.

8. An active power factor correction circuit as claimed in claim 6 wherein the first to sixth rectifying device are diodes.

9. An active power factor correction circuit as claimed in claim 6, wherein the inductance of the inductor is greater than that of the auxiliary inductor.

10. An active power factor correction circuit for improving the efficiency of voltage source with first and second terminals, comprising:

an inductor having a terminal coupled to the first terminal of the voltage source;

a first rectifying device having an anode coupled to the other terminal of the inductor, and a cathode;

a second rectifying device having a cathode coupled to the cathode of the first rectifying device, and an anode;

a first switching device having a first terminal coupled to the anode of the first rectifying device, and a second terminal;

a second switching device, having a first terminal coupled to the anode of the second rectifying device and the second terminal of the voltage source, and a second terminal;

a capacitor having two terminals coupled to the cathode of the second rectifying device and the second terminal of the second switching device respectively;

an auxiliary circuit for making the first switching device and second switching device switch under zero voltage, said auxiliary circuit comprising:

a third rectifying device having an anode coupled to the first terminal of the second switching device, and a cathode;

a fourth rectifying device having an anode and cathode coupled to the anode of the first rectifying device and the cathode of the third rectifying device respectively;

a fifth rectifying device having a cathode coupled to the cathode of the second rectifying device, and an anode;

a sixth rectifying device having a cathode coupled to the anode of the fifth rectifying, and anode;

an auxiliary capacitor having two terminals coupled to the cathode of the fourth rectifying device and anode of the fifth rectifying device respectively;

an auxiliary inductor having two terminals coupled to the cathode of the third rectifying device and the anode of the sixth rectifying device respectively; and an auxiliary switching device having a first terminal and a second terminal coupled to the anode of the sixth rectifying device and the second terminal of the second switching device respectively, and an enable terminal En4, wherein the auxiliary switching device turns on before either the first switching device or the second switching device turns on, and wherein the third to sixth rectifying devices are diodes.

* * * * *